US011300717B2

(12) United States Patent
Gao et al.

(10) Patent No.: US 11,300,717 B2
(45) Date of Patent: Apr. 12, 2022

(54) OPTICAL FILM AND COVER PLATE FOR ELECTRONIC DEVICE

(71) Applicant: Shine Optoelectronics (Kunshan) Co., Ltd., Kunshan (CN)

(72) Inventors: Yulong Gao, Kunshan (CN); Shen Hong, Kunshan (CN); Sheng Zhang, Kunshan (CN); Quan Yuan, Kunshan (CN)

(73) Assignee: Shine Optoelectronics (Kunshan) Co., Ltd., Kunshan (CN)

(*) Notice: Subject to any disclaimer, the term of this patent is extended or adjusted under 35 U.S.C. 154(b) by 322 days.

(21) Appl. No.: 16/493,238

(22) PCT Filed: Mar. 7, 2018

(86) PCT No.: PCT/CN2018/078268
§ 371 (c)(1),
(2) Date: Sep. 11, 2019

(87) PCT Pub. No.: WO2018/166384
PCT Pub. Date: Sep. 20, 2018

(65) Prior Publication Data
US 2020/0132898 A1 Apr. 30, 2020

(30) Foreign Application Priority Data
Mar. 11, 2017 (CN) .......................... 201710143432.1

(51) Int. Cl.
G02B 3/08 (2006.01)
G02B 5/20 (2006.01)
G02B 3/00 (2006.01)

(52) U.S. Cl.
CPC ............. *G02B 5/20* (2013.01); *G02B 3/0043* (2013.01)

(58) Field of Classification Search
CPC ........ G02B 9/60; G02B 7/02; G02B 13/0045; G02B 13/02; G02B 27/0025; G02B 27/646
(Continued)

(56) References Cited

FOREIGN PATENT DOCUMENTS

CN 205365001 U 7/2016
CN 205902241 U * 1/2017
(Continued)

OTHER PUBLICATIONS

Search Report for Chinese Application No. 201710143432.1, dated Mar. 18, 2019.

*Primary Examiner* — William Choi
(74) *Attorney, Agent, or Firm* — Hamilton, Brook, Smith & Reynolds, P.C.

(57) ABSTRACT

The present invention discloses an optical film and a cover plate for an electronic device. The optical film comprises: a support; a micro/nano-structure layer which is formed by providing a groove on a surface of the support, which groove forms a micro/nano-structure and is provided with a filler; wherein the micro/nanostructure layer has a visual gradient in at least one direction. The present invention provides an optical film, which realizes a visual change or a gradient effect, by adjusting the area ratio of the micro/nano-structure, the depth of the groove, the period of the micro/nano-structure or the density of the micro/nano-structure, and produces a decorative or practical effect. It plays an aesthetic role when used in the casing of an electronic device, and it can shade light but not block the sight line when used in buildings or automotive glass. Furthermore, no black spots will appear with this structure, and it is visually more artistic.

15 Claims, 3 Drawing Sheets

(58) Field of Classification Search
USPC .................................. 359/619, 620, 652–654
See application file for complete search history.

(56) References Cited

FOREIGN PATENT DOCUMENTS

| | | |
|---|---|---|
| CN | 205902241 U | 1/2017 |
| JP | 200800936 A | 1/2008 |

* cited by examiner

OPTICAL FILM AND COVER PLATE FOR ELECTRONIC DEVICE

This application is the U.S. National Stage of International Application No. PCT/CN2018/078268, filed on Mar. 7, 2018, which designates the U.S., published in Chinese, and claims priority under 35 U.S.C. § 119 or 365(c) to Chinese Application No. 201710143432.1, filed on Mar. 11, 2017. The entire teachings of the above applications are incorporated herein by reference.

TECHNICAL FIELD

The present invention relates to an optical film, and in particular to a cover plate for an electronic device, which pertains to the technical field of thin films.

BACKGROUND

Many existing technical fields require color or graphic of a product to have a gradient effect, which gives people a visual transition and has an effect of security to some extent. For example, the casing of electric appliance, the casing of a mobile phone, or the film on some electronic devices, or the film on the vehicles in the existing product market also need a gradient effect.

There are various technical solutions adopted in the prior art for color gradient, for example, printing different inks with printing technology and generating gradient by color mixing in the color or pattern, or obtaining a color gradient effect by using a pulling method, or using magnetic powder materials to achieve a color gradient effect. However, these technical solutions will bring some technical problems, and the first technical solution is realized by color mixing, which causes the resolution of the product not high enough, and appearance of dot pattern; the product formed by the second technical solution will be instable between graphics and have poor repeatability; the third one, which uses magnetic powders to achieve a gradient effect, has an excessively high cost, resulting in a high price as industrial production.

In view of this, the present invention aims to solve the existing technical problems by changing the graphic structure.

SUMMARY OF THE INVENTION

In view of above, it is necessary to provide an optical film and a cover plate for an electronic device to solve the above technical problems.

In one aspect, there is provided an optical film comprising:
  a support;
  a micro/nano-structure layer, which is formed by providing grooves on one surface of the support, which grooves form a micro/nano-structure and are provided with a filler;
  wherein the micro/nano-structure layer has a visual gradient in at least one direction.

In one example thereof, the gradient is a color gradient, or a grayscale gradient, or a transmittance gradient, or a reflectivity gradient.

In one example thereof, the gradient is an increase or decrease in transmittance in at least one direction.

In one example thereof, the gradient is a change in luminance from light to dark or from dark to light.

In one example thereof, the gradient is obtained by adjusting the area ratio of the micro/nano-structure, the depth of the groove, the period of the micro/nano-structure, or the density of the micro/nano-structure.

In one example thereof, the micro/nano-structure is a regular grid or a random grid.

In one example thereof, the micro/nano-structure is a cylindrical lens or a microlens.

In one example thereof, the grid lines in the regular grid or the random grid are blank areas, and the regions enclosed by the grid lines are the grooves; or the grid lines are the grooves, and the regions enclosed by the grid line are blank areas.

In one example thereof, a substrate layer is further provided on a surface of the support, and the micro/nano-structure is provided on the side of the support opposite from the substrate layer.

In one example thereof, a reflective layer is further provided on the side of the micro/nano-structure.

In one example thereof, the filler material is one or more selected from an ink, a coloring material, a dyeing material, a metallic material, a reflective material, or a material having a refractive index difference.

In one example thereof, a coloring layer is further provided on the side of the reflective layer opposite from the support.

In one example thereof, an adhesive layer is provided between the substrate layer and the support.

In one example thereof, the material of the coloring layer is one or more selected from an ink, a coloring material, a dyeing material, a metallic material, or a material having a refractive index difference.

In another aspect, there is also provided a cover plate for an electronic device comprising at least any of the optical films described above.

ADVANTAGEOUS EFFECTS OF THE INVENTION

The present invention provides an optical film, which realizes a visual change or a gradient effect by controlling and adjusting the area ratio of the micro/nano-structure, the depth of the groove, the period of the micro/nano-structure or the density of the micro/nano-structure, and produces a decorative or practical effect. It plays an aesthetic role when used in the casing of an electronic device, and it can shade light but not block sight line when used in buildings or automotive glass. Furthermore, no black spots will appear with this structure, and it is visually more artistic.

DETAILED DESCRIPTION OF EMBODIMENTS

Figure 1:
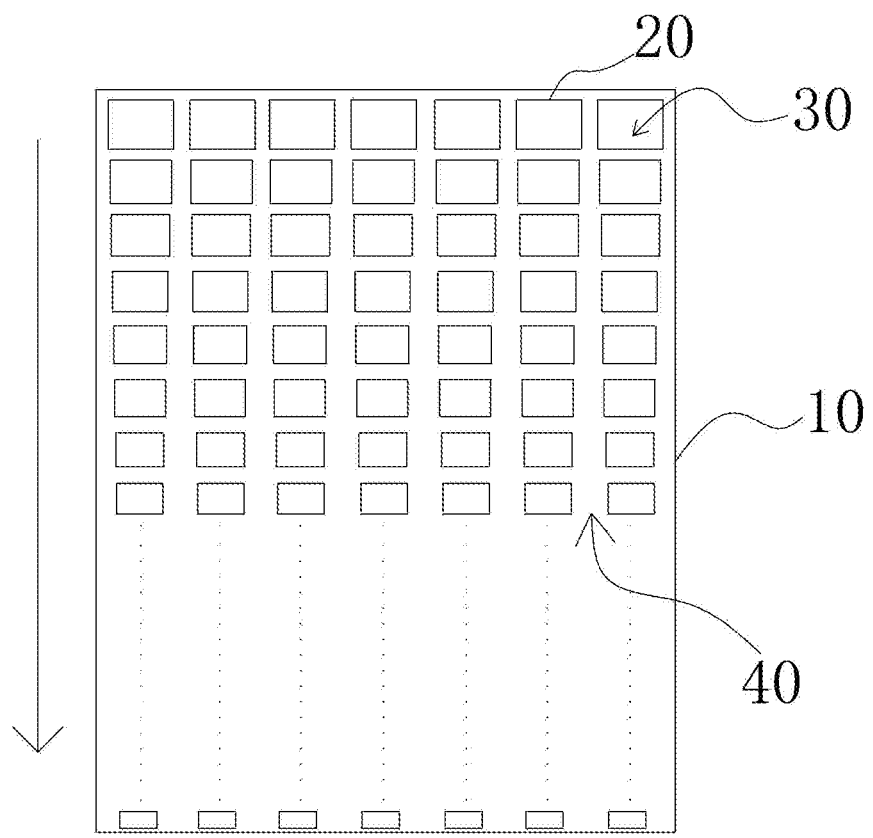
FIG. 1 is a schematic view showing a structure of an optical film of the present invention.

The present invention will be described more fully below with reference to the drawings in order to facilitate the understanding of the present invention. Preferred embodiments of the present invention are given in the drawings. However, the present invention can be implemented in many different forms and is not limited to the embodiments described below. Rather, these embodiments are provided in order that the disclosure of the present invention will be understood more thoroughly.

It should be noted that when an element is referred to as being "provided on" other element, it may be directly on the other element or an interposing element may be present. When an element is considered to be "connected" to other element, it may be directly connected to the other element or an interposing element may be present. The terms "vertical", "horizontal", "left", "right" and the like, as used herein, are for illustrative purposes only and are not intended to be the sole embodiment.

Unless defined otherwise, all technical and scientific terms used herein have the same meanings as commonly understood by one artisan in the technical field to which the present invention belongs. Herein, the terms are used in the Description of the present invention for the purpose of describing particular embodiments, but are not intended to limit the present invention. The term "and/or" as used herein includes any and all combinations of one or more of the listed items.

Figure 5:
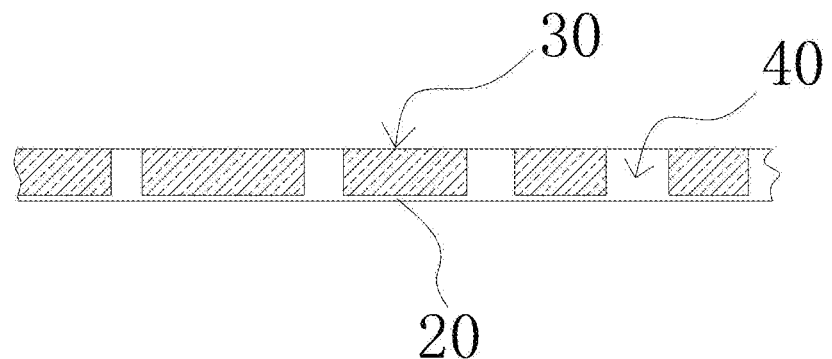
FIG. 5 is a schematic view showing a further structure of the cross section of an optical film of the present invention.

Referring to FIG. 1 and FIG. 5, an optical film 10 includes:
 a support 20, wherein the support 20 includes a first surface and a second surface disposed opposite to the first surface, and the material used for the support 20 may be a heat curable adhesive or a light curable adhesive;
 a micro/nano-structure layer, which is formed by providing a groove 30 on a surface of the support 20, which groove forms a micro/nano-structure, and is provided with a filler;
 wherein, as shown by the arrow in FIG. 1, the micro/nano-structure layer has a visual gradient in at least one direction, and the arrow direction in FIG. 1 is the visual gradient direction, but the gradient direction is not necessarily the strict arrow direction. The term "in one direction" herein may be in a single direction, such as the X-axis direction or the Y-axis direction; or in a general trend, for example, in a preset curve direction.

The "gradient" refers to a change process of color, transmittance, luminance, or the like, for example, the change of color from deep to pale, or the change of luminance from light to dark, or the change of transmittance from large to small, that is, the "gradient" refers to that there is a certain transition or buffer in the change process.

In one example thereof, the gradient is a color gradient, or a grayscale gradient, or a transmittance gradient, or a reflectivity gradient; wherein the color gradient or the grayscale gradient may be done by adjusting the area ratio of the groove to the blank area, the depth of the groove, the period of the micro/nano-structure, or the density of the micro/nano-structure. Referring to FIG. 1 to FIG. 6, they mainly show that the ratio of the groove 30 or 31 to the blank area 40 is adjusted; referring to FIG. 7, it shows that the depth of the groove 32 changes from deep to shallow.

Figure 2:
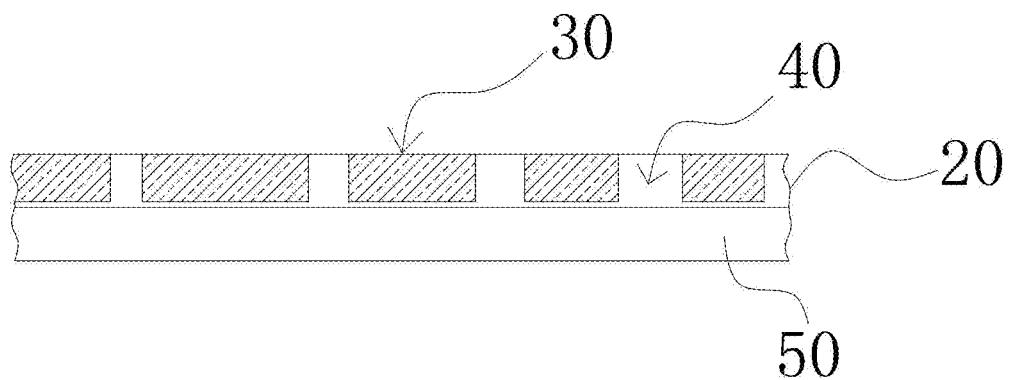
FIG. 2 is a schematic view showing a structure of the cross section of an optical film of the present invention.
Figure 3:
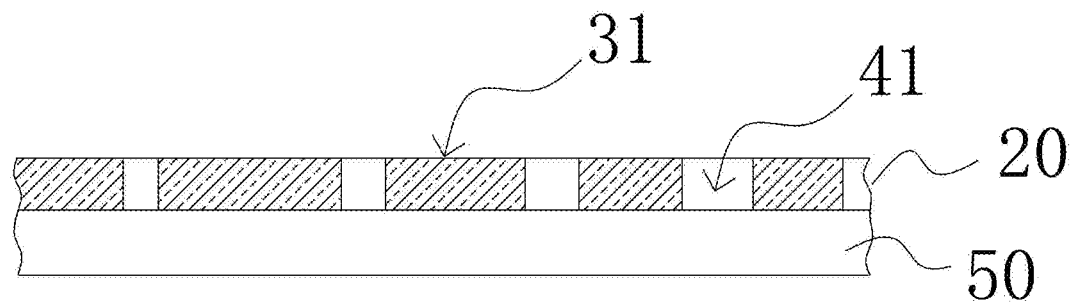
FIG. 3 is a schematic view showing another structure of the cross section of an optical film of the present invention.

Referring to FIG. 2 and FIG. 3, in FIG. 2, a surface of the support 20 is provided with a groove 30, which has a depth of less than the thickness of the support 20, and is filled with one or more of an ink, a coloring material, a dyeing material, a metallic material or a material having a refractive index difference; in FIG. 3, a surface of the support 20 is provided with a groove 31 which has a depth of equal to the thickness of the support, and is filled with one or more of an ink, a coloring material, a dyeing material, a metallic material, a reflective material, or a material having a refractive index difference.

In one example thereof, the gradient is such that the transmittance is increased or decreased in at least one direction; wherein the increase or decrease in transmittance in one direction is done by adjusting the ratio of the groove to the blank area. FIG. 1 to FIG. 7 all show the blank area 40, and the transmittance may be controlled by adjusting the area ratio of the blank area 40 to the groove. In the gradient direction, the area ratio of the micro/nano-structure to the blank per unit area become smaller or larger; and the absolute value of the difference between the area ratios of the micro/nano-structure to the blank area in the adjacent unit area is less than 50%; or the absolute value of the difference between the area ratios of the micro/nano-structure to the blank area in the adjacent unit area is less than or equal to 40%; or the absolute value of the difference between the area ratios of the micro/nano-structure to the blank area in the adjacent unit area is less than or equal to 30%; or the absolute value of the difference between the area ratios of the micro/nano-structure to the blank area in the adjacent unit area is less than or equal to 20%; or the absolute value of the difference between the area ratios of the micro/nano-structure to the blank area in the adjacent unit area is less than or equal to 15%; or the absolute value of the difference between the area ratios of the micro/nano-structure to the blank area in the adjacent unit area is less than or equal to 10%; or the absolute value of the difference between the area ratios of the micro/nano-structure to the blank area in the adjacent unit area is less than or equal to 5%.

In one example thereof, the gradient may also be a change in luminance from light to dark or from dark to light.

In one example thereof, the gradient is done by adjusting the area ratio of the micro/nano-structure, the depth of the groove, the period of the micro/nano-structure or the density of the micro/nano-structure.

Referring to FIG. 1 to FIG. 6, in one example thereof, the micro/nano-structure may be a regular grid or a random grid.

Figure 7:
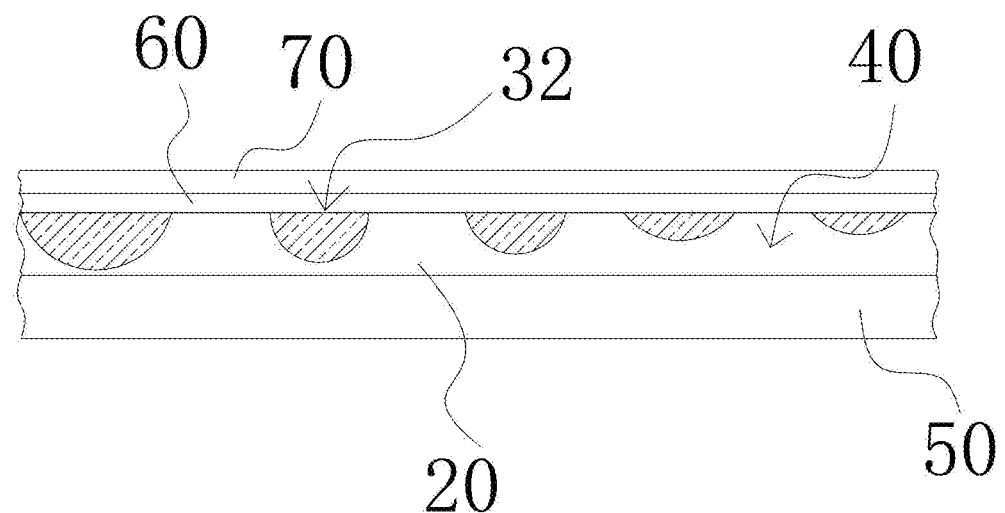
FIG. 7 is a schematic view showing a further structure of the cross section of an optical film of the present invention.

Referring to FIG. 7, in one example thereof, the micro/nano-structure is a cylindrical lens or a microlens.

Referring to FIG. 1 to FIG. 6, in one example thereof, the grid line in the regular grid or the random grid is a blank area, and the region enclosed by the grid line is the groove; or the grid line is the groove, and the region enclosed by the grid line is a blank area.

Figure 4:
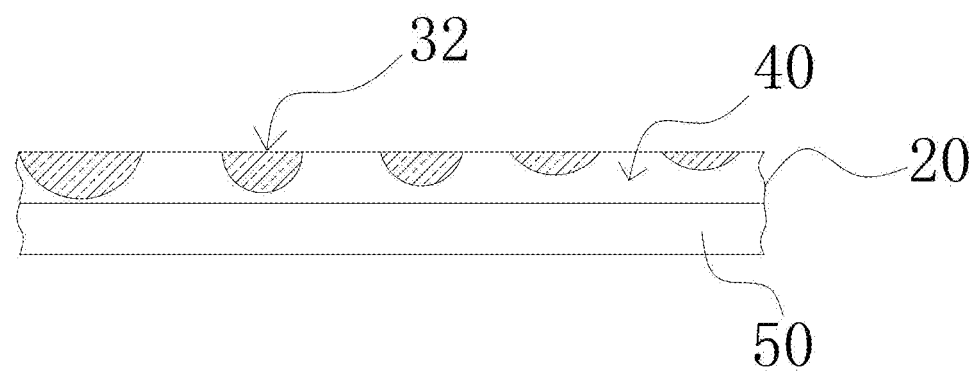
FIG. 4 is a schematic view showing a further structure of the cross section of an optical film of the present invention.

Referring to FIG. 2 to FIG. 4, in one example thereof, a substrate layer 50 is further included to be provided on a surface of the support 20 a surface, and the micro/nano-structure is provided on the side of the support 20 away from the substrate layer 50; the substrate layer 50 may have a material which is selected from glass, PET, organic glass, sapphire, or metal; in this case, the heat curable adhesive or light curable adhesive of the support 20 may be directly applied on the surface of the substrate layer 50, and then a groove 30, 31, or 32 is provided on the side of the support 20 away from the substrate layer 50 to form the micro/nano-structure; alternatively, the support 20 and the substrate layer 50 may be bonded by an adhesive layer (not shown), and in this case, the substrate layer 50 may have a material which is selected from glass, rigid plastic, organic glass, sapphire or metal.

Referring to FIG. 2 to FIG. 7, in one example thereof, the filler material in the groove 30, 31 or 32 is one or more selected from an ink, a coloring material, a dyeing material, a metallic material, or a material having a refractive index difference.

Figure 6:
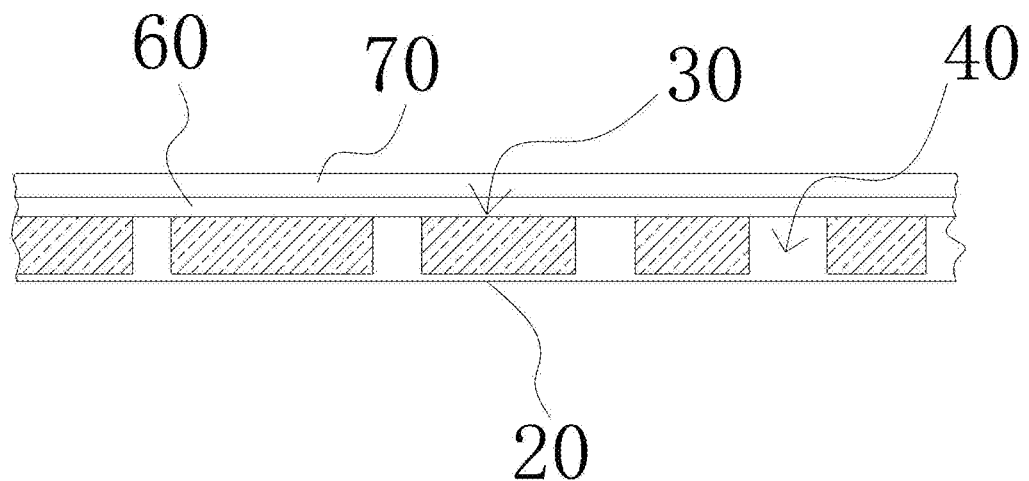
FIG. 6 is a schematic view showing a further structure of the cross section of an optical film of the present invention.

Referring to FIG. 6 to FIG. 7, in one example thereof, a reflective layer 60 is further provided on the side of the micro/nano-structure, which may be formed by coating, evaporation, printing, electroplating, sputtering or the like, and covers the side of the micro/nano-structure.

Referring to FIG. 6 to FIG. 7, in one example thereof, a coloring layer 70 is further provided on the side of the reflective layer 60 away from the support 20, which may be formed by coating, evaporation, printing, electroplating, sputtering or the like. The coloring layer 70 has a material which is one or more selected from an ink, a coloring material, a dyeing material, a metallic material, or a material having a refractive index difference.

A cover plate for an electronic device is also provided comprising at least any of the optical films described above. The electronic device includes a 3C product, or may also be a white household appliance.

The particular embodiments of the present invention have been described in detail with reference to the drawings, to enable the above objects, features and advantages of the present invention to be understood more clearly. Numerous specific details are set forth in the above description in order to provide a thorough understanding of the present invention. However, the present invention can be implemented in many other ways than those described above, and those skilled in the art can make similar modifications without departing from the spirit of the present invention, and thus the present invention is not limited by the specific examples disclosed above. Moreover, various technical features of the above-described examples may be arbitrarily combined. For the sake of conciseness of description, not all possible combinations of the technical features in the above examples are described. However, as long as the combination of these technical features has no contradiction, it should be considered to be within the scope of the description.

The above-mentioned examples are merely illustrative of several embodiments of the present invention, and the description thereof is specific and detailed, but should not be construed as limiting the patentable scope of the present invention. It should be noted that a number of variations and modifications may be made by those skilled in the art without departing from the concept of the present invention, and these variations and modifications belong to the protection scope of the present invention. Therefore, the protection scope of the patent for invention should be determined by the appended claims.

The invention claimed is:

1. An optical film, comprising:
a support;
a micro/nano-structure layer which is formed by providing grooves on one surface of the support, which grooves form a micro/nano-structure and are provided with a filler;
wherein the support comprises blank areas and the grooves provided with a filler;
wherein the micro/nano-structure layer has a visual gradient in at least one direction,
and wherein the visual gradient is realized by controlling and adjusting the area ratio between the grooves and the blank areas, the depth of the grooves, the period of the micro/nano-structure or the density of the micro/nano-structure.

2. The optical film according to claim 1, wherein the gradient is a color gradient, or a grayscale gradient, or a transmittance gradient, or a reflectivity gradient.

3. The optical film according to claim 1, wherein the gradient is an increase or decrease in transmittance in at least one direction.

4. The optical film according to claim 1, wherein the gradient is a change in luminance from light to dark or from dark to light.

5. The optical film according to claim 1, wherein the gradient is obtained by adjusting the area ratio of the micro/nano-structure, the depth of the groove, the period of the micro/nano-structure, or the density of the micro/nano-structure.

6. The optical film according to claim 1, wherein the micro/nano-structure is a regular grid or a random grid.

7. The optical film according to claim 6, wherein the grid lines in the regular grid or the random grid are blank areas, and the regions enclosed by the grid lines are the grooves; or the grid lines are the grooves, and the regions enclosed by the grid lines are blank areas.

8. The optical film according to claim 1, wherein the micro/nano-structure is a cylindrical lens or a microlens.

9. The optical film of claim 1, further comprising a substrate layer provided on one surface of the support, wherein the micro/nano-structure is provided on the side of the support opposite from the substrate layer.

10. The optical film according to claim 9, further comprising an adhesive layer provided between the substrate layer and the support.

11. The optical film according to claim 1, further comprising a reflective layer disposed on the side of the micro/nano-structure.

12. The optical film according to claim 11, further comprising a coloring layer provided on the side of the reflective layer opposite from the support.

13. The optical film according to claim 12, wherein the material of the coloring layer is one or more selected from an ink, a coloring material, a dyeing material, a metallic material, or a material having a refractive index difference.

14. The optical film according to claim 1, wherein the filler material is one or more selected from an ink, a coloring material, a dyeing material, a metallic material, a reflective material, or a material having a refractive index difference.

15. A cover plate for an electronic device, comprising at least the optical film according to claim 1.

* * * * *